F. M. MOLLOY.
TIRE SPREADER.
APPLICATION FILED AUG. 8, 1919.
1,364,947.
Patented Jan. 11, 1921.
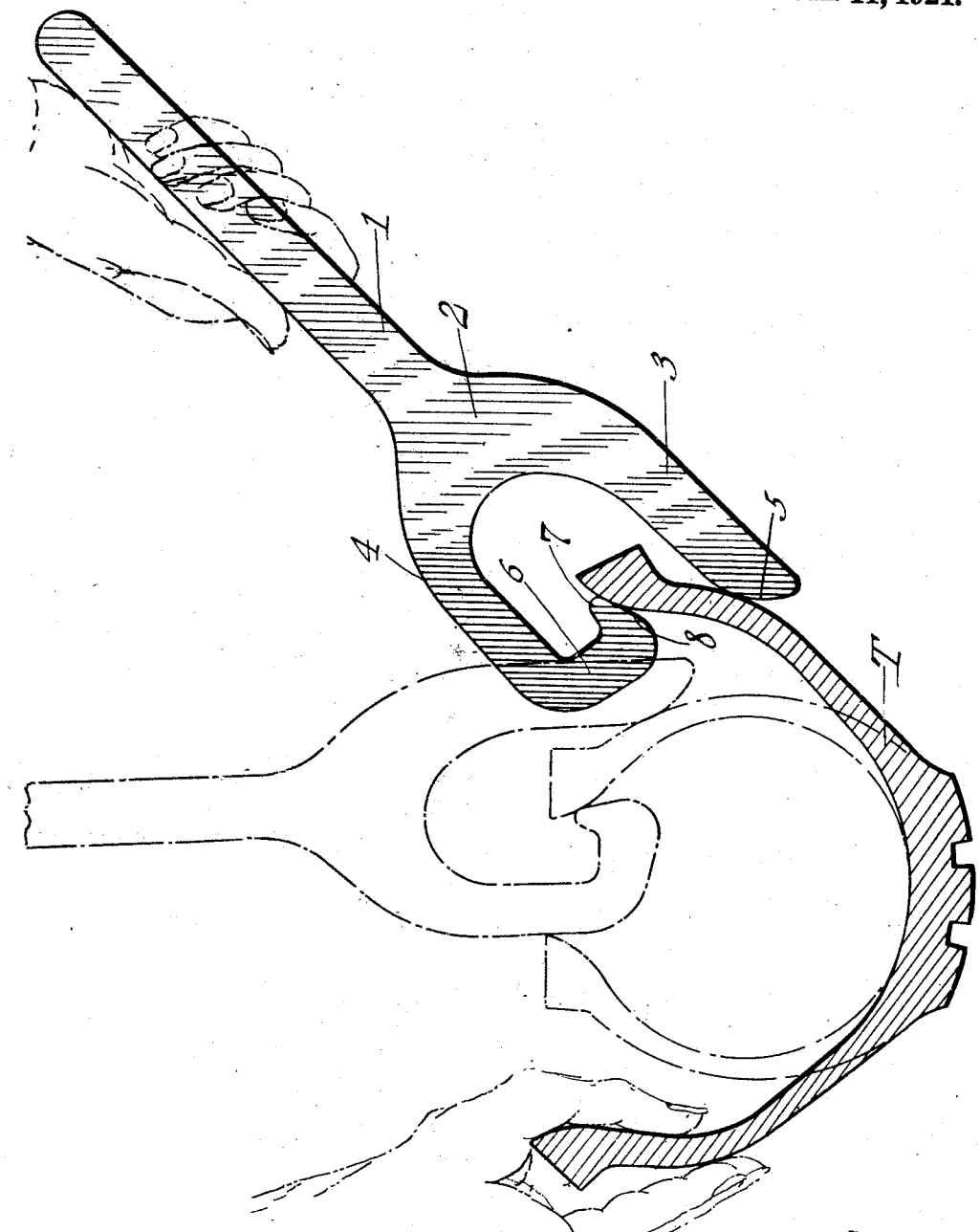

UNITED STATES PATENT OFFICE.

FRANCIS M. MOLLOY, OF BALTIMORE, MARYLAND.

TIRE-SPREADER.

1,364,947.  Specification of Letters Patent.  Patented Jan. 11, 1921.

Application filed August 8, 1919. Serial No. 316,137.

*To all whom it may concern:*

Be it known that I, FRANCIS M. MOLLOY, a citizen of the United States, residing at Baltimore, in the State of Maryland, have invented a new and useful Tire-Spreader, of which the following is a specification.

This invention relates to a tool for use in inspecting tire casings.

It is an object of the present invention to provide a simple and efficient tool whereby the tire can be opened easily and effectively, the said tool providing an extensive leverage and so gripping the casing as to open it out to the edge thereof.

Another object is to provide a tool which will not mar the casings and which can, therefore, be used upon new casings without objection.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawing the preferred form of the invention has been shown in use, two positions being indicated by dotted and full lines respectively.

Referring to the drawing by characters of reference 1 designates an elongated handle provided at one end with an integral yoke 2 from which extend fingers 3 and 4. The finger 3 is longer than the finger 4 and has the inner side of its free end rounded as indicated at 5 thus to form a gripping cam. The finger 4 has an extension 6 projecting at right angles therefrom toward the finger 3 and terminating in a small rounded lug 7 the active side of which is inclined as shown at 8. It will be noted that the angles of the tool are all rounded so as not to scratch or otherwise injure the tire casing T.

When it is desired to inspect a tire casing the operator grasps one edge of the said casing and places the tool astride the other edge thereof with the lug 7 engaging the inner surface of the casing and the finger 3 engaging the outer surface thereof. By then pressing the handle 1 laterally away from the casing the inclined or beveled face 8 of the lug will press the edge portion of the casing toward the finger 3 and cause the casing to bend over the rounded surface 5, so that the casing will be moved from the position indicated by broken lines in the drawing to the position indicated by full lines. The tool can be moved from place to place and the casing thus quickly opened with little exertion.

By providing a lug 7 which extends toward the handle 1 and by providing a handle which is parallel with the fingers 3 and 4 it is possible, after a tire has been spread open and inspected, to pull upwardly on the tool through the handle so that those portions of the fingers engaging the tire will cause the tire to lift off of the floor. During this lifting action the tire can be caused to rotate so that another portion of the tire will be brought to lowermost position on the floor and the tool slid downwardly along the bead to this lowermost portion of the tire which can then be spread open in the manner hereinbefore described. After the tool has once been placed in engagement with the tire it is not necessary to disengage it therefrom until after the tire has been inspected throughout its circumference, the tool being used wherever desired for the purpose of spreading the tire. As the tool is made in but one piece there are no parts likely to work loose and there are no parts requiring adjustment either while the tool is being applied to the tire or while the inspection is going on. Thus a tire can be inspected quickly and thoroughly.

What is claimed is:—

1. A tool for spreading tire casings while off of their rims, including a yoke having parallel fingers of different lengths, an extension projecting inwardly at right angles from the end of the short finger, a tapered and rounded lug extending from the free end of said extension and backwardly toward the center of the yoke, the outer surface of the extension merging into one face of the lug along curved lines to present a rounded shoulder for engagement with a tire casing, that portion of the longer finger which projects beyond the short finger having its inner or active surface rounded to form a cam surface for engaging the outer surface of the casing being acted on, and a handle extending straight from the middle portion of the yoke and along a line substantially parallel with the fingers.

2. A tool for spreading tire casings comprising a yoke having its members forming spaced fingers, a handle extending from the yoke along lines substantially parallel with the fingers, an extension upon one of the fingers projecting toward the other finger and a rounded lug upon the extension projecting toward the handle, said lug and the opposed finger coöperating to grip one side of the tire casing to spread the casing when the handle is swung laterally and to grip the casing to lift it when the handle is pulled upwardly.

In testimony that I claim the foregoing as my own, I have hereto affixed my signature in the presence of two witnesses.

FRANCIS M. MOLLOY.

Witnesses:
  NELLIE B. DAVIDSON,
  HENRY J. LASTNER.